United States Patent
Kondo

(10) Patent No.: US 8,659,693 B2
(45) Date of Patent: Feb. 25, 2014

(54) SOLID-STATE IMAGE PICKUP ELEMENT AND CAMERA SYSTEM

(75) Inventor: Hiroyasu Kondo, Fukuoka (JP)

(73) Assignee: Sony Corporation, Tokyo (JP)

( * ) Notice: Subject to any disclaimer, the term of this patent is extended or adjusted under 35 U.S.C. 154(b) by 340 days.

(21) Appl. No.: 13/067,272

(22) Filed: May 20, 2011

(65) Prior Publication Data
US 2011/0304755 A1 Dec. 15, 2011

(30) Foreign Application Priority Data

Jun. 15, 2010 (JP) ................................. 2010-136254

(51) Int. Cl.
  *H04N 3/14* (2006.01)
  *H04N 5/335* (2011.01)

(52) U.S. Cl.
  USPC ............................ 348/303; 348/304; 348/308

(58) Field of Classification Search
  USPC .......... 348/303–304, 308–309; 341/163–165, 341/169
  See application file for complete search history.

(56) References Cited

U.S. PATENT DOCUMENTS

| | | | |
|---|---|---|---|
| 6,933,972 B2 * | 8/2005 | Suzuki et al. ................. | 348/302 |
| 7,019,345 B2 * | 3/2006 | Pain et al. ..................... | 257/292 |
| 7,292,177 B2 * | 11/2007 | Muramatsu et al. .......... | 341/164 |
| 7,321,329 B2 * | 1/2008 | Tooyama et al. ............. | 341/163 |
| 7,471,230 B2 * | 12/2008 | Tooyama et al. ............. | 341/164 |
| 7,567,280 B2 * | 7/2009 | Muramatsu et al. .......... | 348/294 |
| 7,629,914 B2 * | 12/2009 | Muramatsu et al. .......... | 341/164 |
| 7,948,533 B2 * | 5/2011 | Koseki .......................... | 348/243 |
| 7,952,510 B2 * | 5/2011 | Shimomura et al. .......... | 341/164 |
| 8,233,067 B2 * | 7/2012 | Kondo .......................... | 348/303 |
| 8,325,255 B2 * | 12/2012 | Aruga et al. .................. | 348/294 |
| 2005/0195304 A1 | 9/2005 | Nitta et al. | |
| 2008/0055432 A1 * | 3/2008 | Koseki .......................... | 348/241 |

FOREIGN PATENT DOCUMENTS

| JP | 2005-278135 | 10/2005 |
|---|---|---|
| JP | 2006-222782 | 8/2006 |

OTHER PUBLICATIONS

Woodward Yang, et al., "WA 17.3 An Integrated 800x600 CMOS Imaging System," ISSCC99/Session 17/Paper WA 17.3, 1999 IEEE International Solid-State Circuits Conference, pp. 304-305, and 471.

* cited by examiner

*Primary Examiner* — Kelly L Jerabek

(74) *Attorney, Agent, or Firm* — Rader, Fishman & Grauer PLLC

(57) ABSTRACT

The present disclosure provides a solid-state image pickup element, including, a pixel portion in which plural pixels each carrying out photoelectric conversion are disposed in a matrix, and a pixel signal reading portion having a function of reading out pixel signals from the pixel portion to signal lines, and sampling reset levels and signal levels of the pixels, wherein the pixel signal reading portion includes column processing units converting analog signals read out into digital signals in correspondence to a column disposition of the pixels, respectively, and each of the column processing units carries out the sampling for the reset level of the pixel plural times, and averages a result of the sampling after the result of the sampling is integrated in a digital integrating circuit within each of the column processing units.

19 Claims, 11 Drawing Sheets

SOLID-STATE IMAGE PICKUP ELEMENT AND CAMERA SYSTEM

BACKGROUND

The present disclosure relates to a solid-state image pickup element typified by a CMOS (Complementary Metal Oxide Semiconductor) image sensor, and a camera system using the same.

The same processes as those in a general CMOS type integrated circuit can be used for manufacture of a CMOS image sensor. In addition, the CMOS image sensor can be driven by using a simple power source. Moreover, an analog circuit and a logic circuit can be mixed with each other within the same chip by utilizing the CMOS process.

For this reason, the CMOS image sensor has plural large merits such that it is possible to reduce the number of peripheral ICs.

A 1-channel (ch) output using a Floating Diffusion (FD) amplifier having an FD is the mainstream in an output circuit of a CCD.

On the other hand, the CMOS image sensor has an FD amplifier every pixel. Also, a column parallel output type such that certain one row within a pixel array is selected and pixel signals are simultaneously read out from pixels belonging to the certain one row thus selected in a column direction is the mainstream in an output of the CMOS image sensor.

The reason for this is because it is difficult to obtain a sufficient driving ability in the FD amplifier disposed within the pixel, and therefore it is necessary to reduce a data rate and thus parallel processing is claimed to be advantageous.

The various kinds of pixel signal reading-out (outputting) circuits of the column parallel output type CMOS image sensors have been really proposed.

One of the most advanced forms of the pixel signal reading-out (outputting) circuits is the pixel signal outputting circuit of a type in which it includes an Analog-to-Digital converter (hereinafter referred to as "an ADC" for short) every column, and takes out a pixel signal as a digital signal.

The CMOS image sensor equipped with such a column parallel type ADC, for example, is disclosed in a non-patent document of W. Yang et al. (W. Yang et al., "An integrated 800×600 CMOS Image System," ISSCC Digest of Technical Papers, pp. 304 to 305, Feb., 1999) or Japanese Patent Laid-Open No. 2005-278135.

FIG. 1 is a block diagram, partly in circuit, showing an example of a configuration of a solid-state image pickup element (CMOS image sensor) equipped with a column parallel ADC.

The solid-state image pickup element 1, as shown in FIG. 1, includes a pixel portion 2, a vertical scanning circuit 3, a horizontal transfer scanning circuit 4, and a column processing circuit group 5 composed of an ADC group.

In addition, the solid-state image pickup element 1 includes a Digital-to-Analog converter (hereinafter referred to as "a DAC" for short) 6, and an amplifier circuit (S/A) 7.

The pixel potion 2 is configured by disposing unit pixels 21 each including a photodiode (photoelectric conversion element) and an intra-pixel amplifier in a matrix.

Plural column processing circuits 51 each composing the ADC every column are disposed in plural columns in the column processing circuit group 5.

Each of the column processing circuits (ADCs) 51 includes a comparator 51-1. In this case, the comparator 51-1 compares an analog signal obtained from the pixels every row line via a vertical signal line with a reference signal RAMP (having an electric potential Vslop) as a signal which has a ramp waveform (RAMP) and is obtained by changing a reference signal generated from the DAC 6 in a staircase pattern.

In addition, each of the column processing circuits 51 includes a counter latch (memory) 51-2 for counting a comparison time in the comparator 51-1, and holding therein a count result.

The column processing circuit 51 has an n-bit digital signal converting function. Also, the plural column processing circuits 51 are disposed so as to correspond to the vertical signal lines (column lines) 8-1 to 8-n, respectively, thereby configuring a column parallel ADC block.

Output terminals of the counter latches (memories) 51-2, for example, are connected to a horizontal transfer line 9 having a k-bits width.

Also, k amplifier circuits 7 corresponding to the horizontal transfer line 9 are disposed.

FIG. 2 is a timing chart explaining an operation of the solid-state image pickup element 1 shown in FIG. 1.

In each of the column processing circuits (ADCs) 51, the analog signal (having an electric potential Vsl) read to the vertical signal line 8 is compared with the reference signal RAMP (having an electric potential Vslop) which is changed in the staircase pattern in the comparator 51-1 disposed every column.

At this time, in each of the column processing circuits (ADCs) 51, counting is carried out in the counter latch 51-2 until the analog potential Vsl and the reference signal RAMP (having the electric potential Vslop) intersect in level with each other, so that the output signal from the comparator 51-1 is inverted in polarity. Also, an electric potential (of an analog signal) Vsl of the vertical signal line 8 is converted (AD-converted) into a digital signal.

The AD conversion is carried out twice in one reading operation.

In the first round of the AD conversion, reset levels (P-phase) of unit pixels 21 are read to the vertical signal lines 8-1 to 8-n, respectively, thereby carrying out the AD conversion.

The dispersion in the pixels is contained in the reset levels (P-phase).

In the second round of the AD conversion, signals obtained through the photoelectric conversion in the unit pixels 21 are read to the vertical signal lines 8-1 to 8-n (D-phase), respectively, thereby carrying out the AD conversion.

Since the dispersion in the pixels is contained in the D-phase as well, (D-phase level-P-phase level) is carried out, thereby making it possible to realize Correlated Double Sampling (CDS).

The signals converted into the digital signals are recorded in the counter latches 51-2, respectively, and are then read to the amplifier circuit 7 through the horizontal transfer line 9 in order by the horizontal (column) transfer scanning circuit 4 to be finally outputted.

The column parallel outputting processing is executed in the manner as described above.

Now, Japanese Patent Laid-Open No. 2005-278135 proposes a technique for reducing the noise in the digital processing in the CMOS image sensor having such a column ADC configuration.

With this technique, as shown in FIG. 1, the sampling of the reset level (P-phase), and the sampling of the signal level (D-phase) are each continuously carried out plural times, and the sampling result is either integrated or averaged, thereby enhancing an S/N ratio.

SUMMARY

However, this technique involves two problems: (1) an increase in circuit scale; and (2) an increase in reading period of time.

With regard to the increase in circuit scale as one of the two problems, it is necessary to provide circuits for sampling the P-phase and the D-phase plural times, and integrating and storing the sampling result for the plural times. As a result, the circuit scale of the counter circuit and the memory circuit is necessarily increased.

For example, when the sampling is carried out n times for each of the P-phase and the D-phase, an amount of data finally integrated is n-fold, and thus the circuit scale necessary for the counter is increased by a factor of n−1) bits.

With regard to the increase in reading period of time as the other of the two problems, a period of time for comparison of the P-phase and the D-phase is dominant in a period of time necessary to read out the pixel signals from one row (hereinafter referred to as "a 1H period of time"). Sampling each of the P-phase and the D-phase plural times results in that the 1H period of time is simply increased by a factor for the number of times of the sampling.

For example, when the sampling is carried out n times for each of the P-phase and the D-phase, the necessary 1H period of time is increased n-fold.

The present disclosure has been made in order to solve the problems described above, and it is therefore desirable to provide a solid-state image pickup element which is capable of digitally reducing an amount of noise while an increase in circuit scale and an increase in read period of time are suppressed, and a camera system using the same.

In order to attain the desire described above, according to an embodiment of the present disclosure, there is provided a solid-state image pickup element including: a pixel portion in which plural pixels each carrying out photoelectric conversion are disposed in a matrix; and a pixel signal reading portion having a function of reading out pixel signals from the pixel portion to signal lines, and sampling reset levels and signal levels of the pixels, in which the pixel signal reading portion includes column processing units converting analog signals read out into digital signals in correspondence to a column disposition of the pixels, respectively; and each of the column processing units carries out the sampling for the reset level of the pixel plural times, and averages a result of the sampling after the result of the sampling is integrated in a digital integrating circuit within each of the column processing units.

According to another embodiment of the present disclosure, there is provided a camera system including: a solid-state image pickup element; and an optical system forming an image of a subject on the solid-state image pickup element, in which the solid-state image pickup element includes: a pixel portion in which plural pixels each carrying out photoelectric conversion are disposed in a matrix; and a pixel signal reading portion having a function of reading out pixel signals from the pixel portion to signal lines, and sampling reset levels and signal levels of the pixel signals of the pixels; the pixel signal reading portion includes column processing units converting analog signals read out into digital signals in correspondence to a column disposition of the pixels, respectively; and each of the column processing units carries out the sampling for the reset level of the pixel plural times, and averages a result of the sampling after the result of the sampling is integrated in a digital integrating circuit within each of the column processing units.

As set forth hereinabove, according to the present disclosure, it is possible to digitally reduce an amount of noise while the increase in circuit scale, and the increase in reading period of time are suppressed.

DETAILED DESCRIPTION OF THE PREFERRED EMBODIMENTS

Embodiments of the present disclosure will be described in detail hereinafter with reference to the accompanying drawings.

It is noted that the description will be given below in accordance with the following order:

(1) Entire Configuration of Solid-State Image Pickup Element (First Embodiment)
(2) Basic Configuration of Column ADC
(3) First Concrete Configuration of Column ADC
(4) Second Concrete Configuration of Column ADC
(5) Configuration of Camera System (Second Embodiment)

Figure 1:
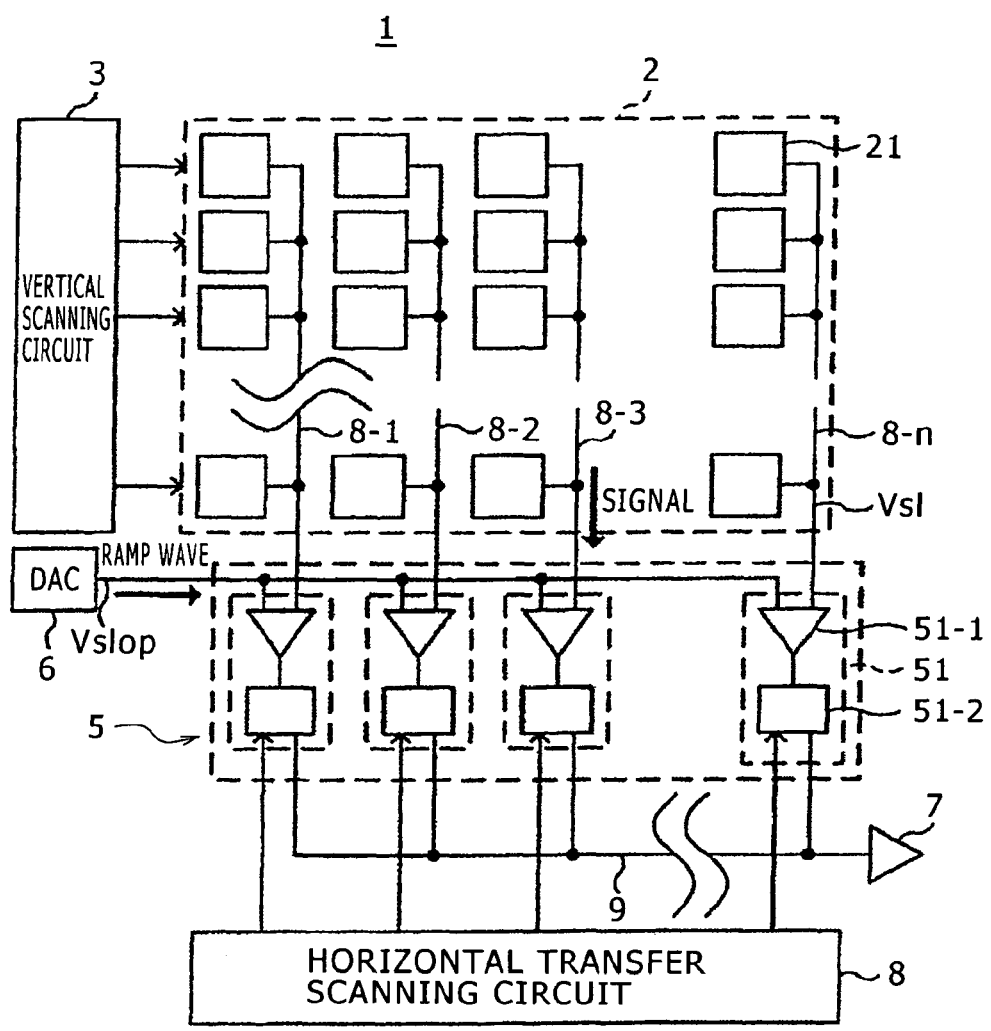
FIG. 1 is a block diagram, partly in circuit, showing an example of a configuration of a solid-state image pickup element (CMOS image sensor) equipped with a column parallel ADC in the related art.
Figure 2:
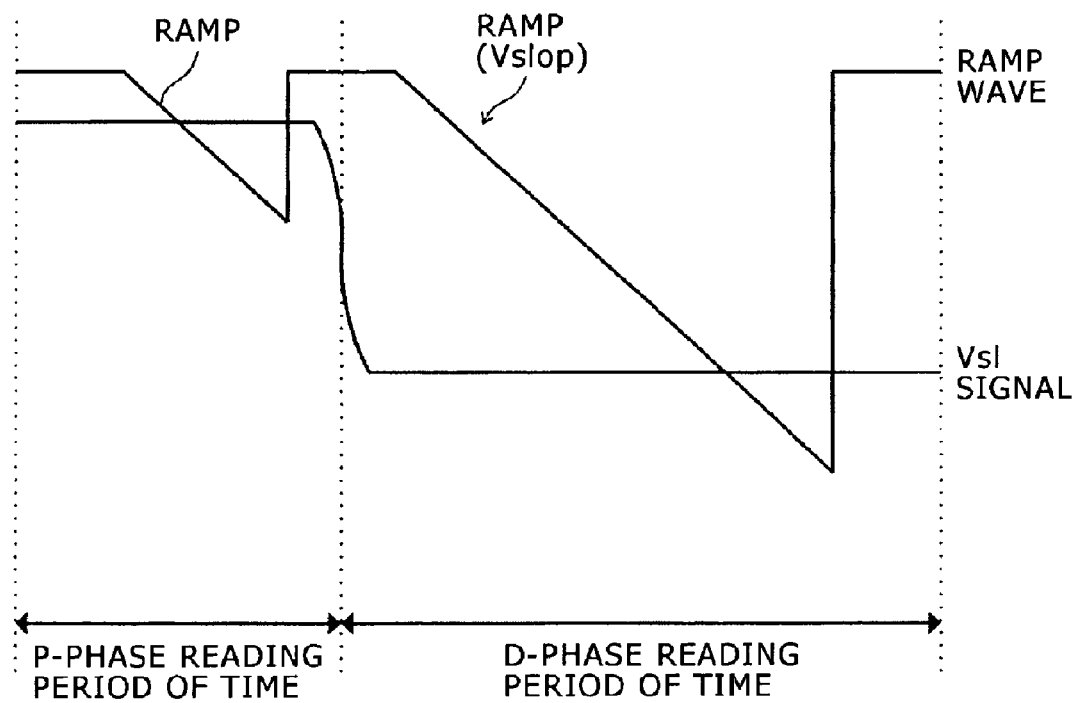
FIG. 2 is a timing chart explaining an operation of the solid-state image pickup element shown in FIG. 1.
Figure 3:
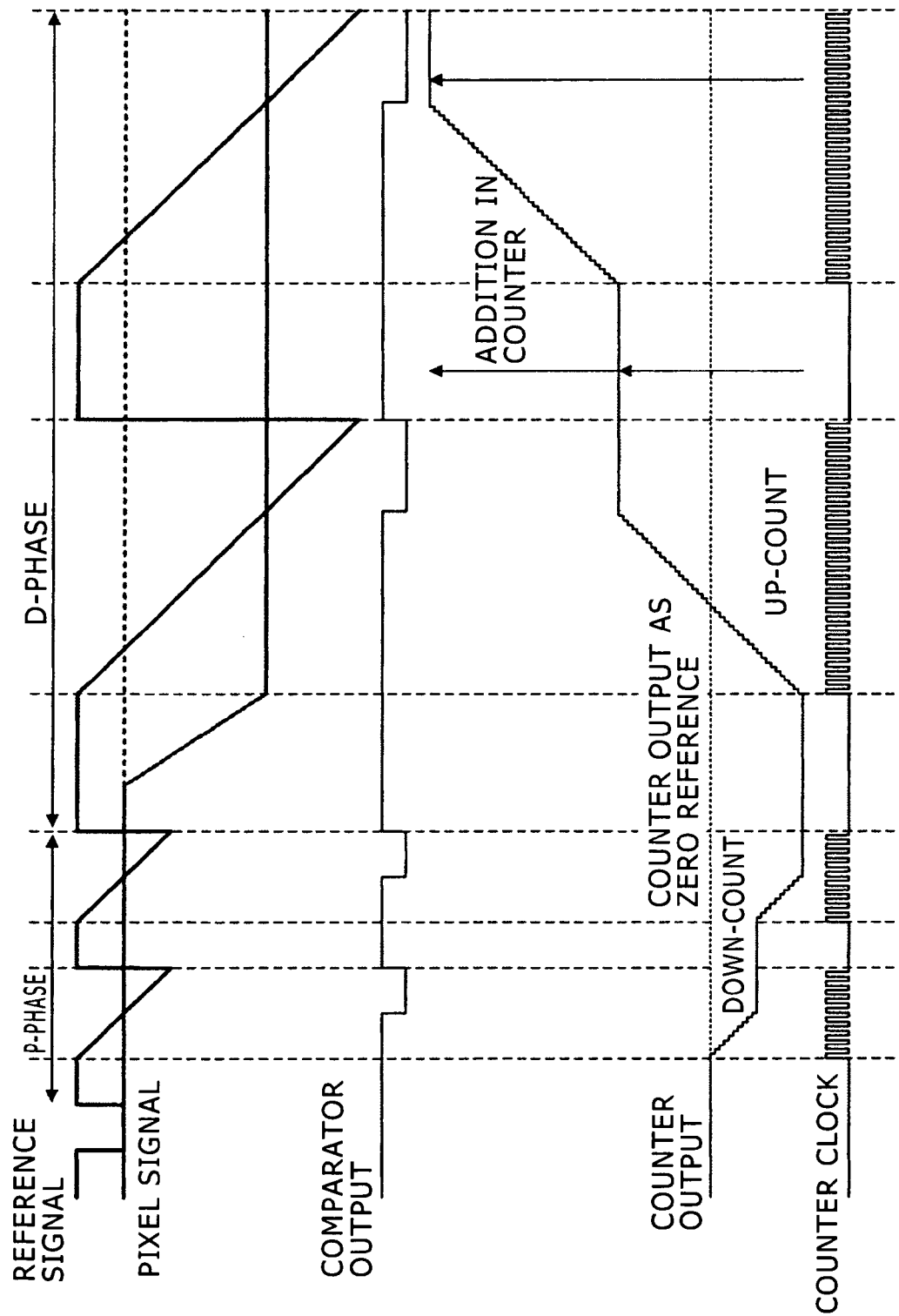
FIG. 3 is a timing chart explaining an outline of an operation in a CMOS image sensor, having a column AD configuration, in which a noise is reduced in digital processing.
Figure 4:
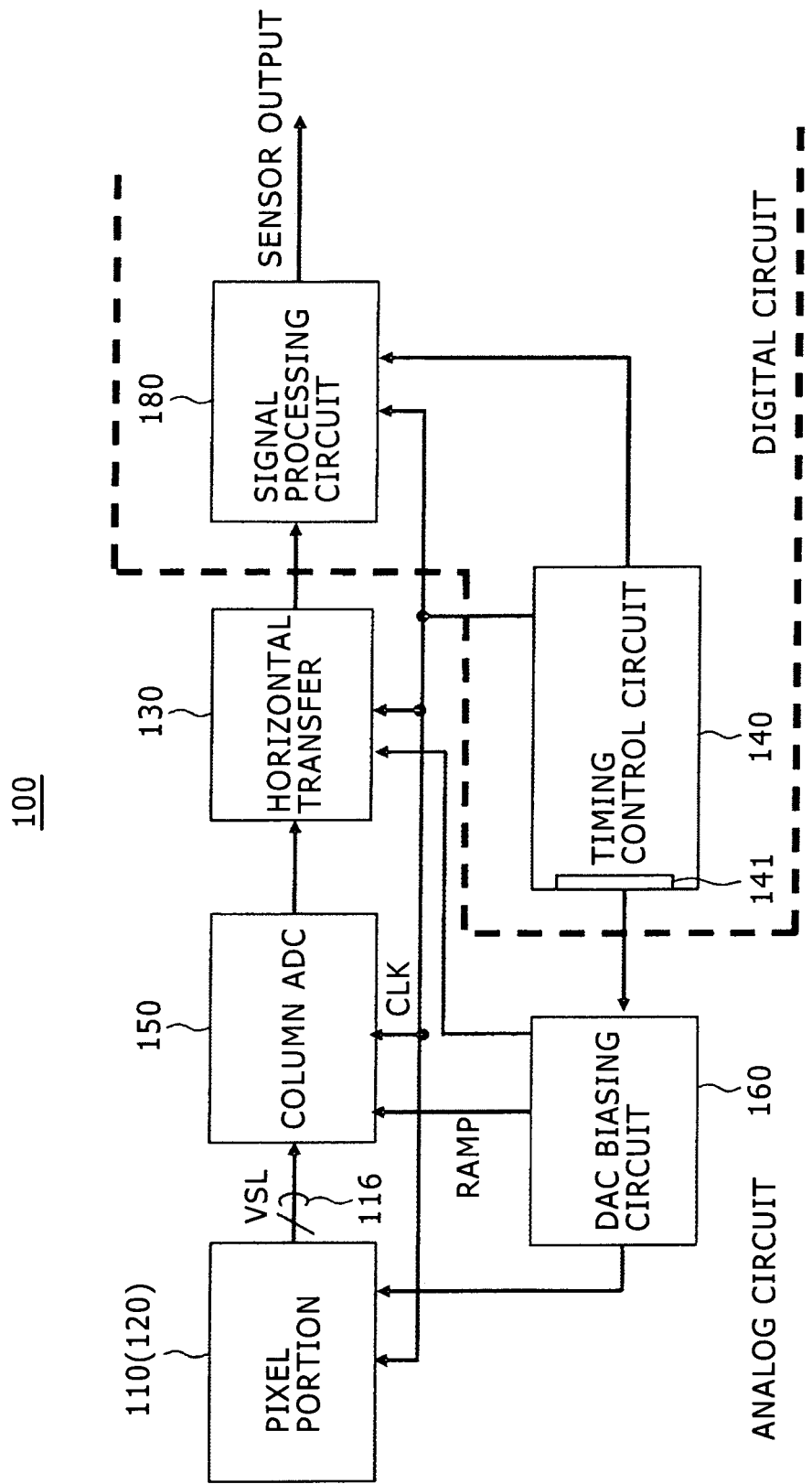
FIG. 4 is a block diagram showing a configuration of a solid-state image pickup element (CMOS image sensor) equipped with a column parallel ADC according to a first embodiment of the present disclosure.

FIG. 4 is a block diagram showing a configuration of a solid-state image pickup element (CMOS image sensor) equipped with a column parallel ADC according to a first embodiment of the present disclosure.

Figure 5:
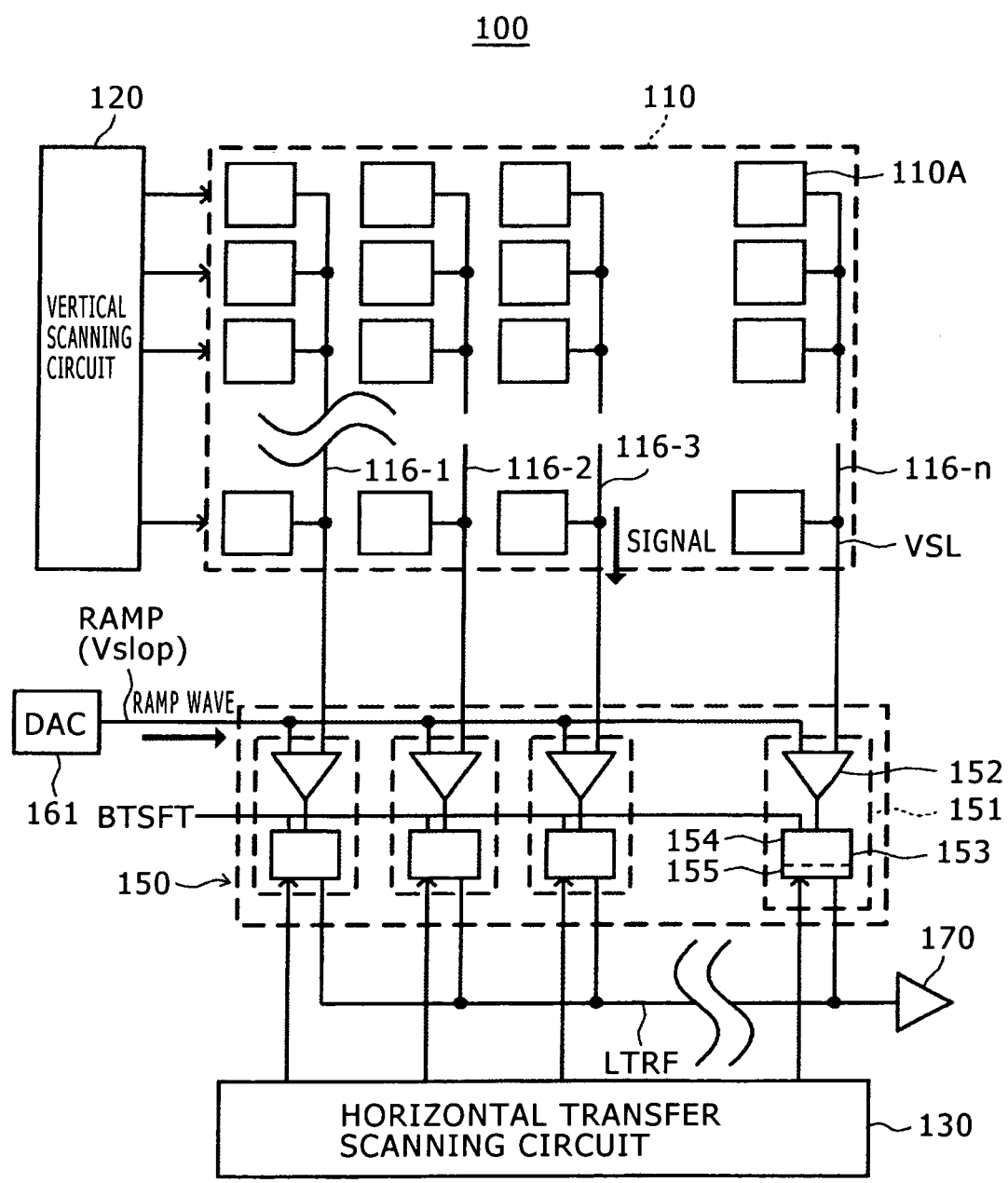
FIG. 5 is a block diagram, partly in circuit, showing more concretely an ADC group in the solid-state image pickup element (CMOS image sensor) equipped with the column parallel ADC shown in FIG. 4.

FIG. 5 is a block diagram, partly in circuit, showing more concretely an ADC group in the solid-state image pickup element (CMOS image sensor) equipped with the column parallel ADC shown in FIG. 4.

<1. Entire Configuration of Solid-State Image Pickup Element (First Embodiment)>

The solid-state image pickup element 100, as shown in FIGS. 4 and 5, includes a pixel portion 110 serving as an image capturing portion, a vertical scanning circuit 120, a horizontal transfer scanning circuit 130, and a timing control circuit 140.

In addition, the solid-state image pickup element 100 includes a column processing circuit group 150 as an ADC group serving as a pixel signal reading circuit, and a DAC and biasing circuit 160 including a Digital-to-Analog Converter (DAC) 161.

The solid-state image pickup element 100 includes an amplifier circuit (S/A) 170, and a signal processing circuit 180.

Of these constituent elements, the pixel portion 110, the vertical scanning circuit 120, the horizontal transfer scanning circuit 130, the column processing circuit group (ADC group) 150, the DAC and biasing circuit 160, and the amplifier circuit (S/A) 170 are composed of analog circuits, respectively.

On the other hand, the timing control circuit 140 and the signal processing circuit 180 are composed of digital circuits, respectively.

The solid-state image pickup element 100 of the first embodiment samples a reset level (P-phase) of the pixel plural times in the column processing circuit. Also, after the sampling, result is integrated in a digital integrating circuit provided within the column processing circuit, the resulting integrated data is averaged, thereby reducing random noises of the pixel and the circuit. In the first embodiment, the number of times of the sampling for the D-phase is one.

In the solid-state image pickup element 100, with regard to a timing at which the reset level (P-phase) is averaged, the integrated reset level of the pixel is averaged before the sampling for the signal level (D-phase) in the pixel is started.

The digital integrated circuit is composed of a counter circuit, and averages the integrated data by bit-shifting an output value from the counter circuit.

A bit shift control BTSFT signal in accordance with which the bit-shifting operation is controlled is inputted to the counter circuit.

In such a way, the solid-state image pickup element 100 carries out continuously only the sampling for the reset level (P-phase) in accordance with the column AD system, and carries out the addition and averaging before the sampling for the signal level (D-phase) is started. As a result, an amount of noises of the P-phase in the pixel and the circuit is digitally reduced.

A concrete configuration and function of the column processing circuit in the column processing circuit group 150 will be described in detail later.

In the pixel portion 110, plural unit pixels 110A each including a photodiode (photoelectric conversion element) and an intra-pixel amplifier are disposed two-dimensionally in a matrix of m row×n column.

[Example of Configuration of Unit Pixel]

Figure 6:
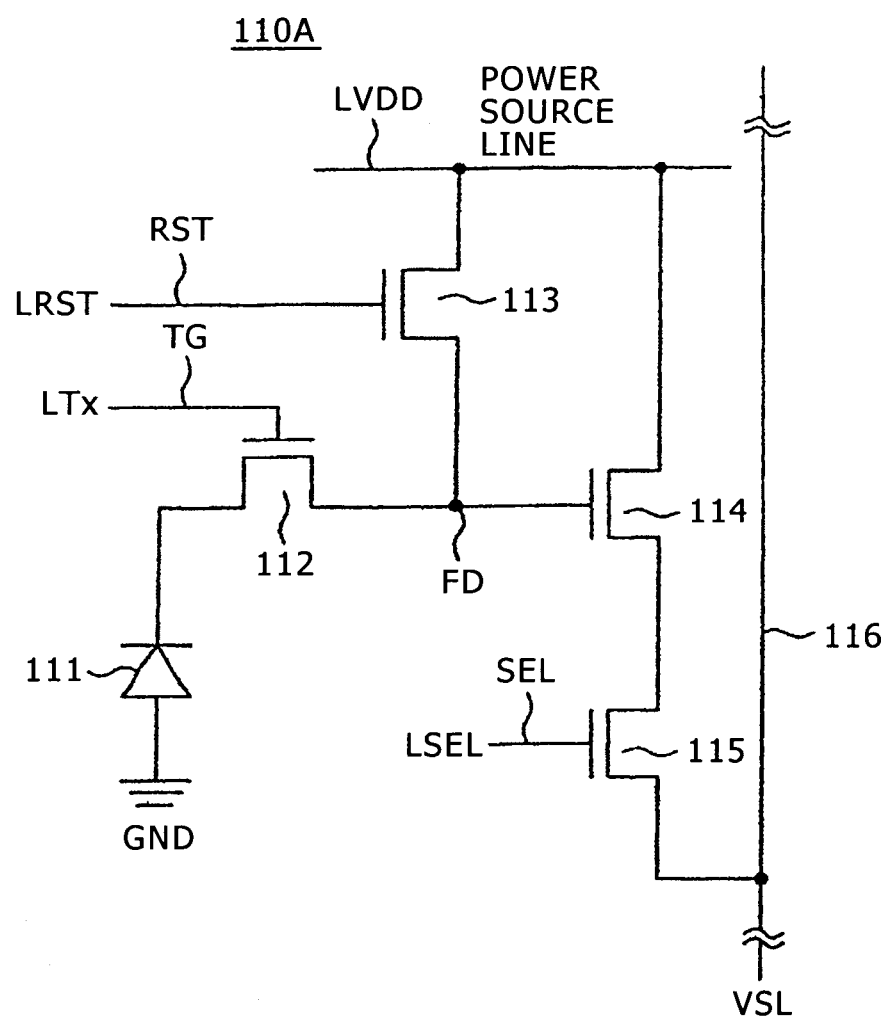
FIG. 6 is a circuit diagram showing an example of a pixel composed of four MOS transistors in the CMOS image sensor according to the first embodiment of the present disclosure.

FIG. 6 is a circuit diagram showing an example of a configuration of a unit pixel composed of four MOS transistors in the CMOS image sensor according to the first embodiment of the present disclosure.

The unit pixel 100A, for example, includes a photodiode 111 serving a photoelectric conversion element.

The unit pixel 110A includes the four MOS transistors as active elements for one photodiode 111: a transfer MOS (Metal Oxide Semiconductor) transistor 112 serving as a transfer element; a reset MOS transistor 113 serving as a reset element; an amplification MOS transistor 114; and a selection MOS transistor 115.

The photodiode 111 photoelectrically converts an incident light into electric charges (electrons in this case) an amount of which corresponds to a quantity of incident light.

The transfer MOS transistor 112 is connected between the photodiode 111 and floating diffusion FD serving as an output node.

A drive signal TG is applied to a gate terminal (transfer gate terminal) of the transfer MOS transistor 112 through a transfer control line LTx, whereby the transfer MOS transistor 112 transfers the electrons generated through the photoelectric conversion in the photodiode 111 as the photoelectric conversion element to the floating diffusion FD.

The reset MOS transistor 113 is connected between a power source line LVDD and the floating diffusion FD.

A reset signal RST is applied to a gate terminal of the reset MOS transistor 113 through a reset control line LRST, whereby the reset MOS transistor 113 resets an electric potential at the floating diffusion FD at an electric potential of the power source line LVDD.

A gate terminal of the amplification MOS transistor 114 is connected to the floating diffusion FD. The amplification MOS transistor 114 is connected to the vertical signal line 116 through the selection MOS transistor 115, thereby composing a source follower together with a constant current source provided outside the pixel portion 110.

Also, a control signal (either an address signal or a selection signal) SEL is applied to a gate terminal of the selection MOS transistor 115 through a selection control line LSEL to turn ON the selection MOS transistor 115.

When the selection MOS transistor 115 is turned ON, the amplification MOS transistor 114 amplifies the electric potential at the floating diffusion FD, and outputs a voltage corresponding to the electric potential thus amplified to the vertical signal line 116. The voltages outputted from the unit pixels 110A through the respective vertical signal lines 116 are outputted to the column processing circuit group 150 serving as a pixel signal reading circuit.

These operations, for example, are carried out simultaneously and in parallel for the pixels for one row because the gate terminals of the transfer MOS transistor 112, the reset MOS transistor 113, and the selection MOS transistor 115 are connected to one another in rows.

The reset control line LRST, the transfer control line LTx, and the selection control line LSEL which are distributed in the pixel portion 110 are wired as one set in rows.

The reset control line LRST, the transfer control line LTx, and the selection control line LSEL are all driven by the vertical scanning circuit 120 serving as the pixel driving portion.

A timing control circuit 140, a vertical scanning circuit 120, and a horizontal transfer scanning circuit 130 are disposed in the solid-state image pickup element 100. In this case, the timing control circuit 140 serves as a control circuit for reading out the signals sequentially from the pixel portion 110 in order and generates an internal clock. The vertical scanning circuit 120 controls row addresses and row scanning. Also, the horizontal transfer scanning circuit 130 controls column addresses and column scanning.

The timing control circuit 140 generates timing signals necessary for signal processing in the pixel portion 110, the vertical scanning circuit 120, the horizontal transfer scanning circuit 130, the column processing circuit group 150, the DAC and biasing circuit 160, and the signal processing circuit 180.

The timing control circuit 140 includes a DAC control portion 141 for controlling generation of a reference signal RAMP (having the electric potential Vslop) for the DAC 161 in the DAC and biasing circuit 160.

Also, the timing control circuit 140 generates a clock CLK becoming a synchronous signal for the counters disposed in the respective column processing circuits (column processing units) 151 in the column processing circuit group 150.

In the pixel portion 110, a light corresponding to an image or a picture image is photoelectrically converted every pixel row by accumulation and discharge of photons using a line shutter. Thus, analog signals VSL are outputted to the column processing circuits (column processing units) 151 of the column processing circuit group 150, respectively.

In the column processing circuit group (ADC group) 150, the ADC blocks (column portions) subject the analog output signals from the pixel portion 110 to APGS-adaptive integration type ADC and the digital CDS using a reference signal (ramp signal) RAMP sent from the DAC 161, and output digital signals each having several bits, respectively.

<2. Basic Configuration of Column ADC>

The column processing circuits (ADCs) 151 each serving as the ADC block are disposed in plural columns in the column processing circuit group 150 in the solid-state image pickup element 100 of the first embodiment.

That is to say, the column processing circuit group 150 has a k-bits digital signal converting function. Also, the column processing circuits (ADCs) 151 in the column processing circuit group 150 are disposed so as to correspond to the vertical signal lines (column lines) 116-1 to 116-m, respectively, thereby configuring the column parallel ADC block.

Each of the ADCs 151 includes a comparator 152. In this case, the comparator 152 compares the analog signal VSL which is obtained from the unit pixels 110A belonging to row lines through the corresponding one of the vertical signal lines 116-1 to 116-n with a reference signal RAMP (having the electrical potential Vslop), having a ramp waveform, to which the reference signal generated from the DAC 161 is changed in the staircase pattern.

In addition, each of the ADCs 151 includes a counter latch 153 for counting a comparison time, and holding therein a count result. The counter latch 153 includes a counter 154 and a latch 155.

Output terminals of the counter latches 153 are connected to the horizontal transfer line LTRF, for example, having a k-bits width.

Also, the k amplifier circuits 170 corresponding to the horizontal transfer line LTRF, and the signal processing circuit 180 are disposed.

In the ADC (column processing circuit) group 150, the analog signal electric potentials VSLs read to the vertical signal lines 116-1 to 116-n, respectively, are each compared with the reference signal Vslop (the ramp signal RAMP having the slope waveform which is changed linearly so as to have a certain slope in the comparators 152 which are disposed so as to correspond to the columns, respectively.

At this time, the counter latches 153 which are disposed so as to correspond to the columns, respectively, similarly to the case of the comparators 152 are operated.

In each of the ADSs 151, the reference signal RAMP (having the electric potential Vslop) having the ramp waveform, and the count value are changed while they show one-to-one correspondence, thereby converting the electric potential (of the analog signal) VSL of the vertical signal line 116 into the digital signal.

The ADC 151 converts a change in voltage of the reference signal RAMP (having the electric potential Vslop) into a change in time. Thus, the ADC 151 converts the electric potential (of the analog signal) VSL of the vertical signal line 116 into the digital value by counting the time concerned with a certain period (clock).

When the analog signal VSL and the reference signal RAMP (having the electric potential Vslop) intersect in level with each other, the polarity of the output signal from the comparator 152 is inversed. As a result, the clock stops to be inputted to the counter latch 153, or the clock which has stopped to be inputted to the counter latch 153 is inputted to the counter latch 153, thereby completing the AD conversion.

The output signal from the comparator 152 is outputted as a counter stop signal CNTSTOP to the counter latch 153.

The counter stop signal CNTSTOP, for example, is held at a high level until the analog signal VSL and the reference signal RAMP (having the electric potential Vslop) intersect in level with each other, and is inverted from the high level to a low level when the analog signal VSL and the reference signal RAMP (having the electric potential Vslop) intersect in level with each other.

After completion of the AD conversion period of time described above, the data which has been held in the counter latch 153 is transferred to the horizontal transfer line LTRF by the horizontal transfer scanning circuit 130, and is then inputted to the signal processing circuit 180 through the amplifier circuit 170, thereby generating a two-dimensional image through predetermined signal processing.

In the horizontal transfer scanning circuit 130, the data for several channels is simultaneously and in parallel transferred in order to ensure the transfer speed.

The timing control circuit 140 generates timings necessary for signal processing in the blocks such as the pixel portion 110 and the column processing circuit group 150.

The signal processing circuit 180 in the subsequent stage of the timing control circuit 140 carries out correction for a vertical line defect and a point defect in the read-out signal, and clamp processing for the signal. Also, the signal processing circuit 180 executes predetermined pieces of digital signal processing such as parallel-serial conversion, compression, encoding, adding, averaging, and an intermittent operation.

In the solid-state image pickup element 100 of the first embodiment, the digital output signal from the signal processing circuit 180 is transmitted as an input signal to an ISP (Imaging Signal Processor) or a base band LSI (Large Scale Integration).

It is noted that a method of temporarily sampling signal electric charges generated by a photoelectric conversion element such as a photodiode and intended to turn into an optical signal in a capacitor disposed in a subsequent stage of a CMOS switch through the MOS switch disposed in the vicinity of the photoelectric conversion element, and reading out the optical signal from the capacitor is known as a technique used in an operation for reading out a pixel signal in a CMOS image sensor.

In a sampling circuit, a noise having an inverse correlation is normally contained in a sampling capacitance value. In the pixel, no noise is generated in this sampling process because when the signal electric charges are transferred to the sampling capacitor, the signal electric charges are perfectly transferred thereto by utilizing an electric potential gradient. However, the noise is contained in the sampling capacitance value when a voltage level in the capacitor in the subsequent stage is reset at a certain reference value.

Correlated Double Sampling (CDS) is adopted as a technique for removing the noise.

The CDS is a technique with which one state (reset level) right before the signal electric charges are read out once to be stored, a signal level after sampling is then read out, and a difference between the reset level and the signal level is obtained, thereby removing the noise.

In the first embodiment, the sampling for the reset level (P-phase) in the unit pixel 110A is carried out plural times in the column processing circuit 151. Also, the sampling result is integrated in a digital integrating circuit provided within the column processing circuit 151, and are then averaged, thereby reducing the noises generated in the pixel and the circuit. In the first embodiment, the number of times of the sampling for the D-phase is one.

The DAC 161 generates the reference signal (ramp signal) RAMP having the slope waveform which is linearly changed so as to have a certain slope under the control made by the DAC control portion 141, and supplies the reference signal RAMP thus generated to the column processing circuit group (column ADC group) 150.

The DAC 161, for example, generates the reference signal RAMP having a down slope plural times (twice in this case) for the P-phase period of time under the control made by the DAC control portion 141, and outputs the reference signal RAMP having the down slope.

Or, under the control made by the DAC control portion 141, a first time, the DAC 161, for example, generates the reference signal RAMP having the down slope for the P-phase period of time and outputs the reference signal RAMP having the down slope, and a second time, continuously outputs the reference signal RAMP having the up slope without carrying out the resetting.

<3. First Concrete Configuration of Column Processing Circuit (Column ADC)>

Next, a description will be given with respect to a first concrete configuration of the column processing circuit ADC 151.

The column processing circuit ADC 151 in the first embodiment continuously carries out only the sampling for the reset level (P-phase), and subjects the sampling result to addition and averaging before the sampling for the signal level (D-phase) is started, thereby digitally reducing an amount of noises in the pixel and the circuit in the P-phase.

The counter circuit of the counter latch 153 is composed of the counter 154. In this case, the counter 154 carries out the counting operation synchronously with the operation of the DAC 161, and stops the counting operation in accordance with an output result S152 (refer to FIG. 7) from the comparator 152.

The feature of the first embodiment is that a bit shift control signal BTSFT is inputted to the counter circuit, and the counter circuit has a circuit configuration with which a count result can be bit-shifted in accordance with the bit shift control signal BTSFT.

Figure 7:
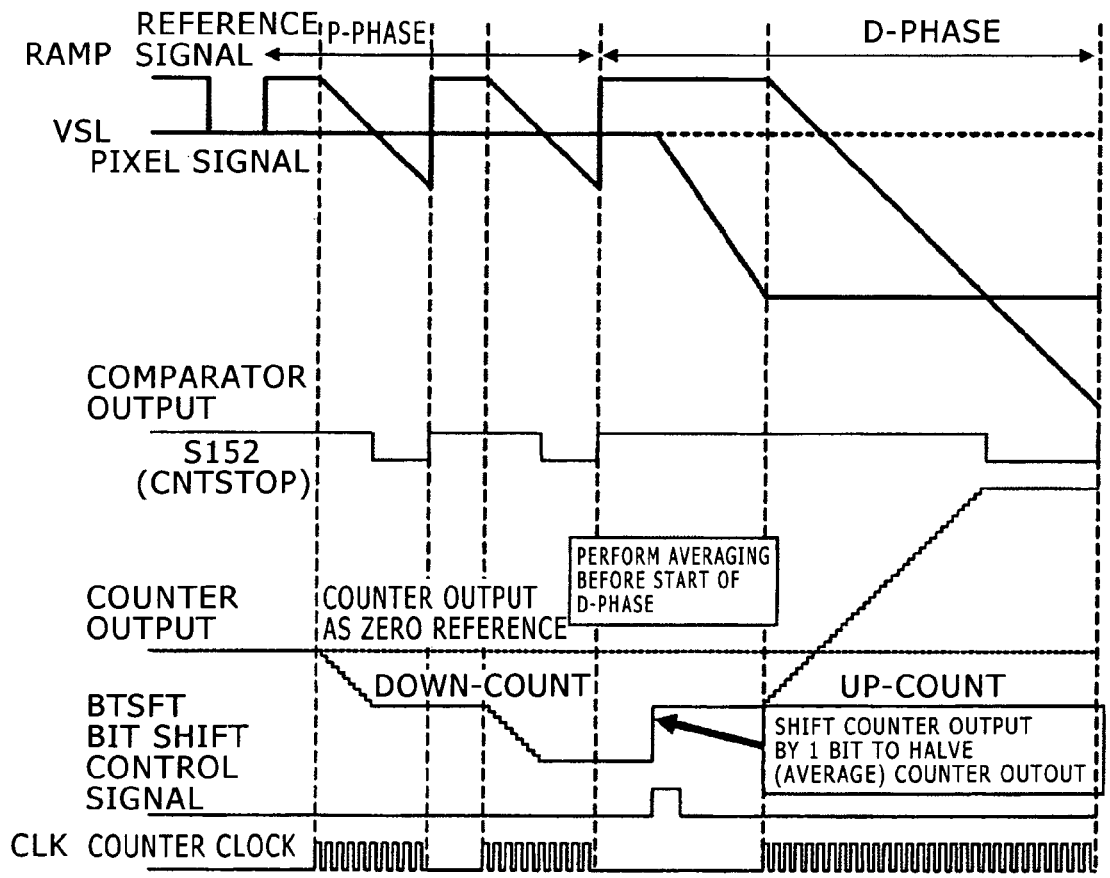
FIG. 7 is a timing chart explaining an operation when a P-phase is sampled twice in a first concrete configuration of a column ADC in the first embodiment of the present disclosure.

FIG. 7 is a timing chart showing an operation when the reset level (P-phase) is sampled twice in the first concrete configuration of the column processing circuit ADC 151 in the first embodiment.

Firstly, the reset level (P-phase) is continuously read out twice, and is integrated in the counter 154 in a minus count manner to be held therein.

After that, the result of sampling the reset level (P-phase) twice is integrated in the counter 154, and is then averaged by shifting the output signal from the counter 154 by 1 bit.

At this time point, an amount of data becomes comparable to that in the case where the reset level (P-phase) is sampled once, and an amount of noise become $1/\sqrt{2}$ times less than that in the case where the reset level (P-phase) is sampled once because the amount of noise is averaged. As a result, the noise owing to the P-phase sampling is reduced and thus the S/N ratio is enhanced.

After that, the signal level (D-phase) is read out only once, and is then subjected to up-counting addition, whereby the same reset and pixel signal data are subjected to the CDS, and are then outputted to the circuit in the subsequent stage.

In the case of the normal operation for sampling each of the reset level (P-phase) and the signal level (D-phase) only once, the noise characteristics are largely deteriorated due to the CDS.

The reason for this is because the noise in the band frequency higher than that of the CDS cannot be removed away, and the noise for the P-phase and the noise for the D-phase are added to each other.

On the other hand, when as with the first embodiment, the reset level (P-phase) is sampled twice, the noise for the P-phase is reduced by a factor of $\sqrt{2}$. Therefore, even when the noise for the P-phase is added to the noise for the D-phase, the addition result is reduced as compared with the case in the phase of the normal operation.

For example, in a dark state in which a light does not impinge on the CMOS image sensor at all, the P-phase is equal in amount of noise to the D-phase. When let Vn uVrms be the amount of noise, the amount of noise is expressed by $\sqrt{2}\cdot Vn$ in total becomes Vn of the P-phase and Vn of the D-phase are simply added to each other.

On the other hand, when as with the first embodiment, the P-phase is sampled twice, the noise for the P-phase is reduced by a factor of $\sqrt{2}/Vn$. Therefore, when the noise for the P-phase is added to Vn for the D-phase, the addition result is expressed by $\sqrt{(3/2)}\cdot Vn$. Thus, the addition result is reduced by about 15% relative to the case of the normal operation.

The first embodiment has two merits over the technique for noise reduction described in Japanese Patent Laid-Open No. 2006-222782 described above: (1) there is no increase in circuit scale; and (2) the 1H period of time is not largely increased.

With regard to the circuit scale, in the case of the related art described above, the circuit scales of the counter and the memory are increased because the data obtained by sampling the D-phase plural times is held therein.

On the other hand, in the case of the first embodiment, the circuit scale is increased by only a very less amount of data obtained by sampling the P-phase plural times. In addition, since the P-phase undergoes minus-counting, and the D-phase undergoes plus-counting, the data for plural times of the sampling for the P-phase can be deal with by the circuit scale adapted to hold the data for one time of the sampling for the D-phase, and thus it is unnecessary to increase the circuit scale.

With regard to the increase in 1H period of time, in the case of the related art described above, since each of the P-phase and the D-phase is sampled plural times, the 1H period of time is increased by a period of time for the number of times of the sampling.

On the other hand, in the case of the first embodiment, only the P-phase whose rate occupying the 1H period of time is small is sampled plural times. For this reason, the increase in 1H period of time is smaller than that in the related art described above.

For example, in the case of the general column ADC system, the period of time necessary to sample the P-phase and the D-phase occupies a greater part of the 1H period of time. Thus, when each of the P-channel and the D-channel is sampled twice as with the related art described above, the 1H period of time is increased by a factor of 2.

On the other hand, when the P-phase is sampled only once as with the first embodiment, since the ratio in the sampling period of time of the P-phase to the D-phase is generally 1:8

(for example, 9 bits for the P-phase and 12 bits for the D-phase), the 1H period of time is increased by only about 10%.

[Example of Circuit of Counter Equipped With Bit Shifting Function]

Here, there is shown an example of a circuit of a counter equipped with a bit shifting function which can be applied to the first embodiment of the present disclosure.

Figure 8:
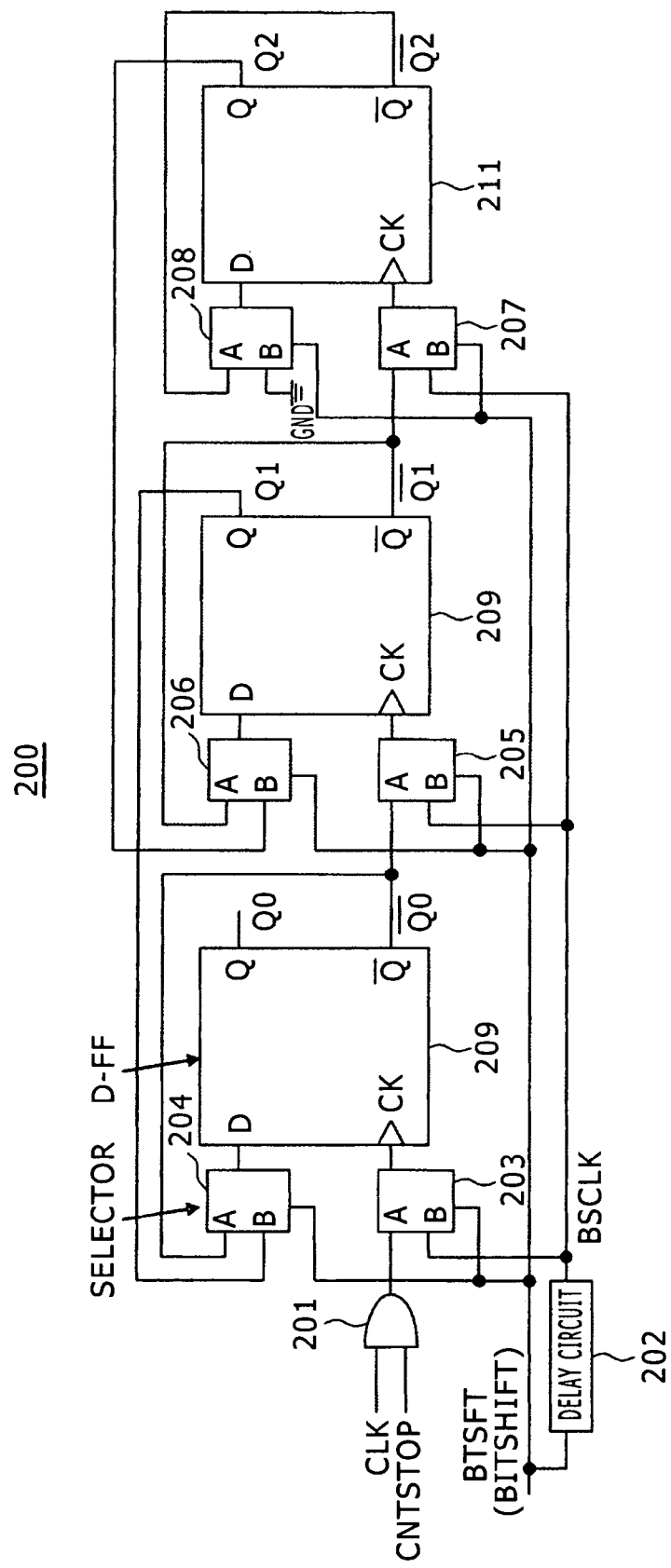
FIG. 8 is a circuit diagram showing an example of a counter equipped with a bit shift function which can be applied to the first embodiment of the present disclosure.

FIG. 8 is a circuit diagram showing an example of a circuit of a counter equipped with a bit shifting function which can be applied to the first embodiment of the present disclosure.

Figure 9:
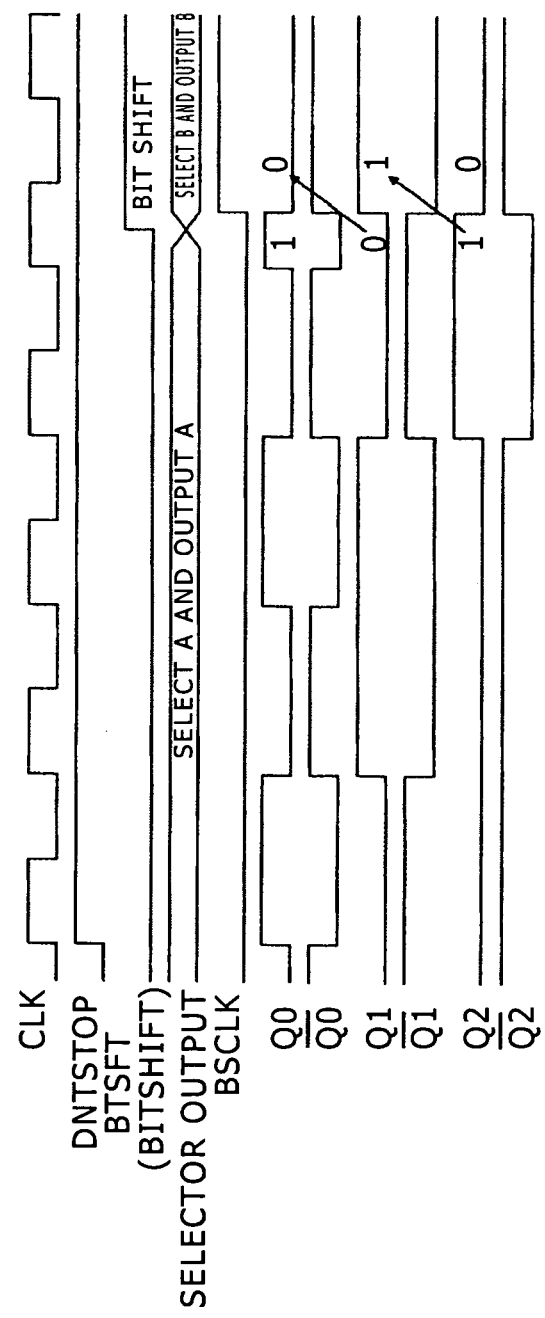
FIG. 9 is a timing chart explaining an operation of the counter shown in FIG. 8.

FIG. 9 is a timing chart explaining an operation of the counter shown in FIG. 8.

Referring to FIG. 8, the counter is designated by a reference numeral 200.

The counter 200 shown in FIG. 8 includes a 2-input AND 201, a delay circuit 202, selectors 203 to 208, and D type flip flops (FFs) 209 to 211.

A clock CLK generated in the timing control circuit 140 is supplied to one input terminal of the 2-input AND 201. Also, an active counter stop signal CNTSTOP held at the low level is supplied to the other input terminal of the 2-input AND 201.

The delay circuit 202 delays the bit shift control signal BTSFT by a predetermined time and outputs the bit shift control signal BTSFT thus delayed as a bit shift clock BSCLK.

The bit shift clock BSCLK is supplied in parallel to input terminals B of the selectors 203 to 208.

The selectors 203 to 208 select signals to input terminals A thereof and output the signals when the bit shift control signal BTSFT is held at the low level, and select signals to the input terminals B thereof and output the signals when the bit shift control signal BTSFT is held at the high level.

Therefore, when each of the selectors 203, 205 and 207 receives the bit shift control signal BTSFT at the high level, each of the selectors 203, 205 and 207 outputs the bit shift clock BSCLK which is obtained delaying the bit shift control signal BTSFT supplied to the input terminal B side thereof by a predetermined time.

When a counter stop signal CNTSTOP is in an inactive state and is held at the high level, the clock CLK as an output signal from the AND 201 is supplied to the input terminal A of the selector 203. Either the clock CLK or the bit shift clock BSCLK which is selected in the selector 203 is supplied to a clock terminal CK of the FF 209.

A negative-phase output signal /Q0 (a mark "/" represents a negative-phase) is supplied from the FF 209 in the first stage to an output terminal A of the selector 204, and a positive-phase output signal Q1 is supplied to the FF 210 in the second stage to the input terminal B of the selector 204.

Either a negative-phase output signal /Q0, from the FF 209, which is selected by the selector 204, or a positive-phase output signal Q1 from the FF 210 in the second stage is supplied to a data input terminal D of the FF 209.

The negative-phase output signal /Q0 from the FF 209 in the preceding stage is supplied to the input terminal A of the selector 205. Either the negative-phase output signal /Q0, from the FF 209, which is selected by the selector 205, or the bit shift clock BSCLK is supplied to the clock terminal CK of the FF 210.

A negative-phase output signal /Q1 is supplied from the FF 210 to the input terminal A of the selector 206, and a positive-phase output signal Q2 is supplied from the FF 211 in the third stage to the intput terminal B of the selector 206.

Either the negative-phase output signal /Q1, from the FF 210, which is selected by the selector 206, or the positive-phase output signal Q2 from the FF 211 in the third stage is supplied to a data input terminal D of the FF 210.

The negative-phase output signal /Q1 is supplied from the FF 210 in the preceding stage to an output terminal A of the selector 207. Either the negative-phase output signal /Q1, from the FF 210, which is selected by the selector 207, or the bit shift clock BSCLK is supplied to a clock terminal CK of the FF 211.

A negative-phase output signal /Q2 is supplied from the FF 211 to an input terminal A of the selector 208, and an input terminal B of the selector 208 is connected to a grounding electric potential GND.

Either a negative-phase output signal /Q2, from the FF 211, which is selected by the selector 208, or a signal held at the low level as the grounding electric potential is supplied to a data input terminal D of the FF 211.

In such a way, in the counter 200, for the period of time for which the bit shift control signal BTSFT is held at the low level, the selectors 203, 205 and 207 each select the clock CLK, and select the negative-phase output signals /Q0, /Q1, and /Q2 of the FF 209, the FF 210, and the FF 211 in the subsequent stages of the selectors 203, 205 and 207, respectively.

In this case, the FF 209, the FF 210, and the FF 211 latch the negative-phase output signals /Q0, /Q1, and /Q2 in their stages synchronously with the clock CLK, respectively.

On the other hand, for the period of time for which the bit shift signal BTSFT is held at the high level, the selectors 203, 205 and 207 each select the bit shift clock BSCLK, and select the negative-phase output signals /Q0, /Q1, and /Q2 of the FF 209, the FF 210, and the FF 211 in the subsequent stages, respectively.

In this case, the FF 209 and the FF 210 latch the negative-phase output signals Q1 and Q2 in their stages synchronously with the clock CLK, respectively. Also, the FF 211 latches the signal held at the low level.

In such a way, only the sampling for the reset level (P-phase) is carried out, and the sampling result is averaged before the sampling of the signal level (D-phase) is started.

<4. Second Concrete Configuration of Column ADC>

Next, a description will be given with respect to a second concrete configuration of the column ADC 150.

Figure 10:
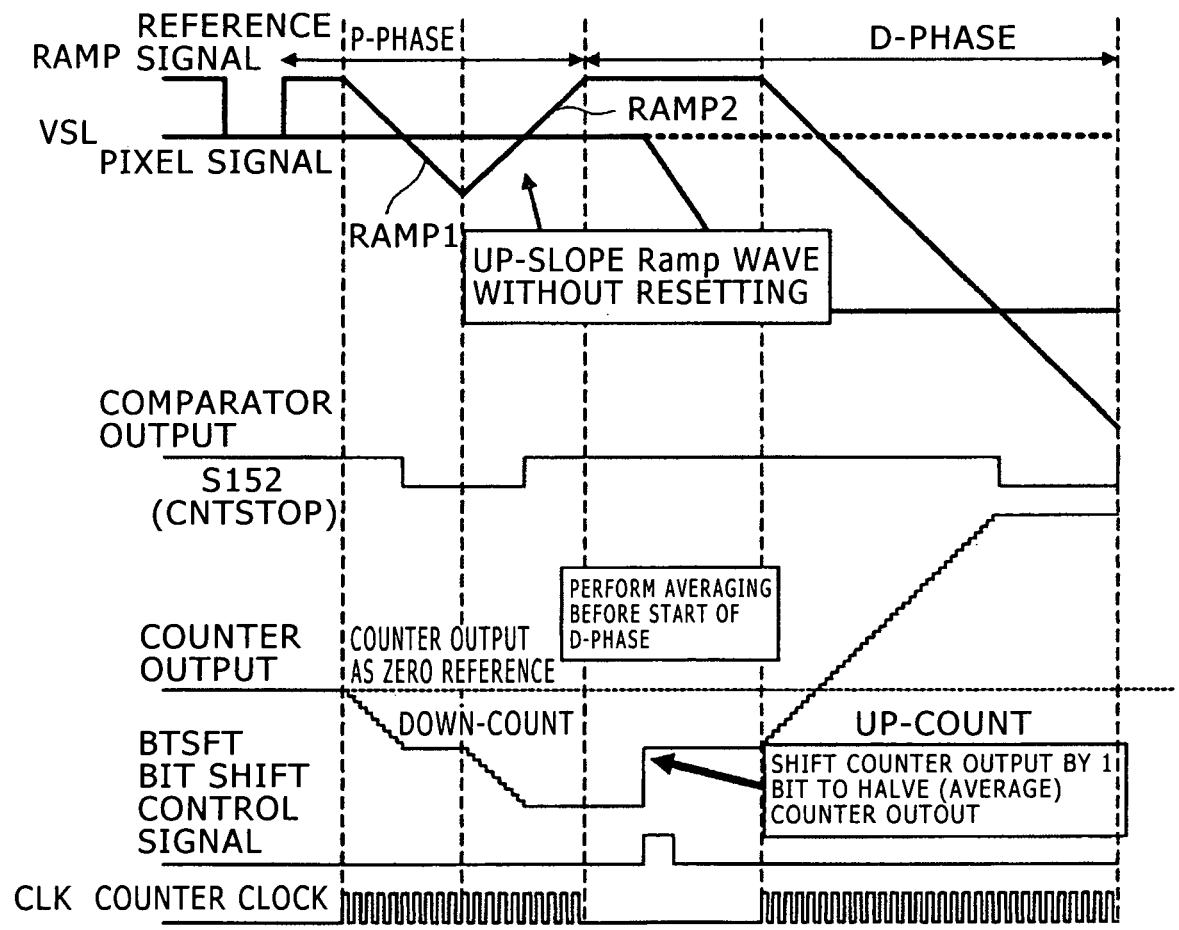
FIG. 10 is a timing chart explaining an operation when the P-phase is sampled twice in a second concrete configuration of the column ADC in the first embodiment of the present disclosure.

FIG. 10 is a timing chart explaining an operation when the P-phase is sampled twice in the second concrete configuration of the column ADC in the first embodiment.

The first embodiment features that only the P-phase is sampled twice. Thus, it is necessary to slope the reference signal (ramp wave) RAMP once by an amplitude of the P-phase per one sampling for the P-phase. For this reason, in the case of the first concrete configuration described above, it is necessary to return the ramp wave RAMP back to the reset level before the second round of the sampling for the P-phase is carried out.

In the second concrete configuration, for the purpose of reducing a period of time necessary to return the ramp wave RAMP back to the reset level, the first round of a ramp wave RAMP1 is down-sloped as usual, and the second round of a ramp wave RAMP2 is up-sloped without carrying out the resetting.

In the second concrete configuration, a settling period of time for the DAC 161 for outputting the ramp wave RAMP can be reduced and the increase in 1H period of time can be further suppressed as compared with the first concrete configuration.

As has been described, according to the first embodiment of the present disclosure, it is possible to obtain the following effects:

(1) The noises in the pixel and the circuit can be reduced;
(2) The increase in circuit scale can be suppressed; and
(3) An increase in amount of 1H period of time is small as compared with the related art.

As described above, according to the first embodiment, an amount of noise can be digitally reduced while an increase in circuit scale, and an increase in reading period of time is suppressed.

The solid-state image pickup element having such effects can be applied as an image pickup device of a digital camera or a video camera.

<5. Configuration of Camera System (Second Embodiment)>

Figure 11:
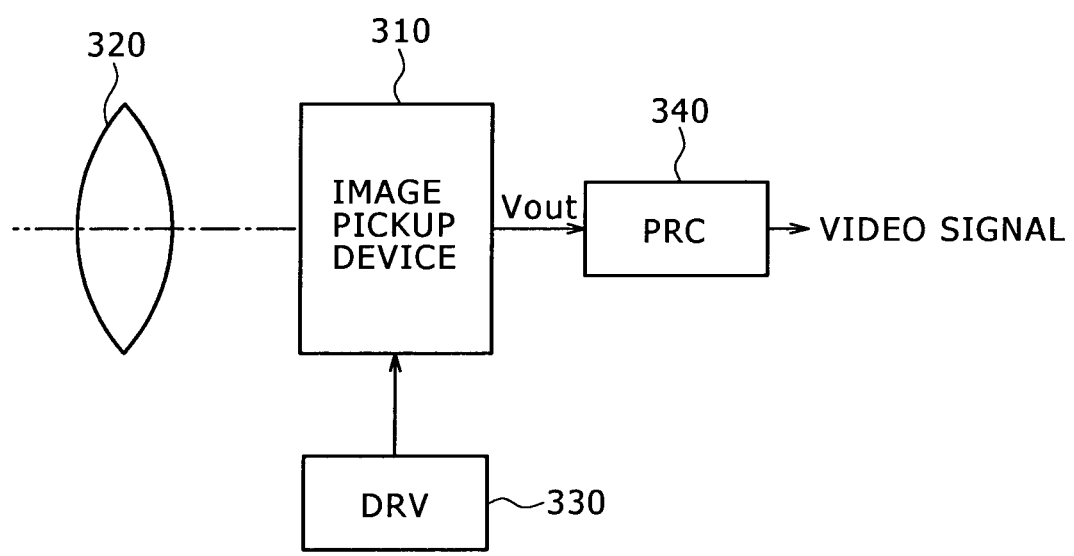
FIG. 11 is a block diagram showing a configuration of a camera system according to a second embodiment of the present disclosure to which the solid-state image pickup element according to the first embodiment of the present disclosure is applied.

FIG. 11 is a block diagram showing a configuration of a camera system, according to a second embodiment of the present disclosure, to which the solid-state image pickup element according to the first embodiment of the present disclosure is applied.

As shown in FIG. 11, the camera system 300 includes an image pickup device 310 to which the solid-state image pickup element 100 of the first embodiment can be applied.

In addition, the camera system 300 includes an optical system for guiding an incident light to a pixel area of the image pickup device 310 (for forming an image of a subject), for example, a lens 320 for forming an image corresponding to the incident light (image light) on an image area.

Also, the camera system 300 includes a driving circuit (DRV) 330 and a signal processing circuit (PRC) 340. In this case, the driving circuit 330 drives the image pickup device 310. Also, the signal processing circuit 340 processes an output signal from the image pickup device 310.

The driving circuit 330 includes a timing generator (not shown) for generating various kinds of timing signals including a start pulse and a clock pulse in accordance with which circuits within the image pickup device 310 are driven. Thus, the driving circuit 330 drives the image pickup device 310 in accordance with a predetermined timing signal.

In addition, the signal processing circuit 340 executes predetermined signal processing for the output signal from the image pickup device 310.

An image signal obtained through the predetermined processing in the signal processing circuit 340 is recorded in a recording medium such as a memory. Image information recorded in the recording medium is hard-copied by using a printer or the like. In addition, the image signal obtained through the processing in the signal processing circuit 340 is displayed in the form of a moving image on a monitor composed of a liquid crystal display device or the like.

As described above, an image pickup apparatus such as a digital still camera is equipped with the solid-state image pickup element 100 described above as the image pickup device 310, thereby making it possible to realize a highly precise camera which consumes having the less noise influence exerted thereon.

The present disclosure contains subject matter related to that disclosed in Japanese Priority Patent Application. JP 2010-136254 filed in the Japan Patent Office on Jun. 15, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state image pickup element comprising:
    a pixel portion in which plural pixels each carrying out photoelectric conversion are disposed in a matrix; and
    a pixel signal reading portion having a function of reading out pixel signals from said pixel portion to signal lines, and sampling reset levels and signal levels of said pixels, wherein
    said pixel signal reading portion includes column processing units converting analog signals read out into digital signals in correspondence to a column disposition of said pixels, respectively, and
    each of said column processing units carries out the sampling for the reset level of the pixel plural times, and averages a result of the sampling after the result of the sampling is integrated in a digital integrating circuit within each of said column processing units,
    wherein each of said column processing units includes:
    a comparator comparing the analog signal read out from corresponding ones of said pixels with a reference signal having a ramp waveform in which a voltage value is changed with time; and
    a counter latch whose operation is controlled in accordance with an output from said comparator, which is adapted to count a comparison time of said comparator, and which stops a counting operation thereof when the output from said comparator is inverted in polarity, thereby holding a count value.

2. The solid-state image pickup element according to claim 1, wherein the reference signal having the ramp waveform in which the voltage value is changed with time in the same down-slope or up-slope style is supplied to said comparator plural times for a sampling period of time for a reset level of an image.

3. The solid-state image pickup element according to claim 1, wherein a first reference signal having a ramp waveform in which a voltage value is changed with time in a down-slope or up-slope manner for a sampling period of time for a reset level of the image, and a second reference signal in which a voltage value is continuously changed with time in the down-slope or up-slope manner so as to follow the first reference signal.

4. A solid-state image pickup element comprising:
    a comparator configured to compare a ramp waveform with a reset level of an analog pixel signal before comparing a signal level of the analog pixel signal with said ramp waveform, said comparator being configured to output a counter stop signal at a logic level when said ramp waveform transitions to an electric potential that is less than said reset level of the analog pixel signal;
    a counter latch configured to perform an adjustment of a count result upon detection of a clock pulse, said counter latch being configured to average said count result when said analog pixel signal is at said reset level.

5. The solid-state image pickup element according to claim 4, wherein said counter latch is configured to average said count result only when said analog pixel signal is at said reset level.

6. The solid-state image pickup element according to claim 4, wherein said counter latch is configured to detect said clock pulse.

7. The solid-state image pickup element according to claim 4, wherein said counter latch is configured to average said count result after said adjustment of the count result.

8. The solid-state image pickup element according to claim 4, wherein said counter latch is configured to bit-shift said count result to average said count result.

9. The solid-state image pickup element according to claim 4, wherein said counter latch is configured to shift said count result by 1 bit to average said count result.

10. The solid-state image pickup element according to claim 4, wherein said adjustment of the count result is inhibited when said counter stop signal is at said logic level.

11. The solid-state image pickup element according to claim 10, wherein said adjustment of the count result is permitted when said counter stop signal is at a voltage level other than the logic level.

12. The solid-state image pickup element according to claim 4, wherein said adjustment of the count result is permitted when said counter stop signal is at said logic level and said ramp waveform decreases, said adjustment of the count result being inhibited when said counter stop signal is at said logic level and said ramp waveform increases.

13. The solid-state image pickup element according to claim 4, wherein said counter stop signal is at said logic level when a voltage level of the ramp waveform is less than said reset level of the analog pixel signal.

14. The solid-state image pickup element according to claim 4, wherein said comparator is configured to output said counter stop signal at a logic level when said ramp waveform transitions to an electric potential that is less than said signal level of the analog pixel signal.

15. The solid-state image pickup element according to claim 4, wherein said adjustment of the count result is a decrementation of the count result, said decrementation occurring when said analog pixel signal is at said reset level.

16. The solid-state image pickup element according to claim 4, wherein said adjustment of the count result is an incrementation of the count result, said incrementation occurring when said analog pixel signal is at said signal level.

17. The solid-state image pickup element according to claim 4, wherein said reset level of the analog pixel is a voltage potential.

18. The solid-state image pickup element according to claim 4, further comprising:
a unit pixel configured to convert incident light into an electric charge, said electric charge being converted into said signal level of the analog pixel signal.

19. A camera system comprising:
the solid-state image pickup element according to claim 4;
an optical system configured to form an image of a subject onto said solid-state image pickup element.

* * * * *